United States Patent
Bayramoglu

(10) Patent No.: US 9,207,791 B2
(45) Date of Patent: Dec. 8, 2015

(54) HEAT SENSITIVE TOUCH PANEL, DETECTING METHOD AND MANUFACTURING METHOD THEREOF

(71) Applicant: TPK TOUCH SOLUTIONS (XIAMEN) INC., Xiamen (CN)

(72) Inventor: Gokalp Bayramoglu, Las Vegas, NV (US)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 264 days.

(21) Appl. No.: 13/952,665

(22) Filed: Jul. 28, 2013

(65) Prior Publication Data

US 2014/0169399 A1    Jun. 19, 2014

(30) Foreign Application Priority Data

Jul. 31, 2012  (CN) .......................... 2012 1 0269393

(51) Int. Cl.
*G06F 3/041* (2006.01)
*G06F 3/045* (2006.01)

(52) U.S. Cl.
CPC ................. *G06F 3/041* (2013.01); *G06F 3/045* (2013.01); *Y10T 29/49162* (2015.01)

(58) Field of Classification Search
CPC combination set(s) only.
See application file for complete search history.

(56) References Cited

U.S. PATENT DOCUMENTS

| 5,853,793 A | 12/1998 | Zitzmann et al. | |
|---|---|---|---|
| 8,237,677 B2 * | 8/2012 | Jiang et al. | 345/173 |
| 2011/0148815 A1 * | 6/2011 | Tsai | 345/175 |

FOREIGN PATENT DOCUMENTS

| JP | 2004241358 A | * | 8/2004 |
|---|---|---|---|
| TW | I337318 | | 6/2010 |

* cited by examiner

*Primary Examiner* — Kumar Patel
*Assistant Examiner* — Amy C Onyekaba
(74) *Attorney, Agent, or Firm* — Gokalp Bayramoglu

(57) ABSTRACT

The present disclosure provides a heat sensitive touch panel that comprises a substrate and a sensing layer disposed on the substrate, wherein the sensing layer comprises heat sensitive blocks and conductive wires. The heat sensitive blocks are made of a heat sensitive material and disposed on the substrate. The conductive wires are disposed on the substrate to electrically connect the heat sensitive blocks with a controller. If a finger or a dedicated stylus touches the heat sensitive touch panel, resistance of the heat sensitive blocks will change correspondingly such that the output signals generated when the touch panel is touched by a finger or a dedicated stylus are different from those when untouched, thereby being able to determine the touch location. The heat sensitive touch panel can detect a touch location of a conductive object or a non-conductive object on the touch panel.

21 Claims, 6 Drawing Sheets

HEAT SENSITIVE TOUCH PANEL, DETECTING METHOD AND MANUFACTURING METHOD THEREOF

BACKGROUND OF THE DISCLOSURE

This Application claims the benefit of the People's Republic of China Application NO. 201210269393.7, filed on Jul. 31, 2012

FIELD OF THE DISCLOSURE

The present disclosure relates to touch technology, and more particularly, to a heat sensitive touch panel, a detecting method and a manufacturing method thereof.

DESCRIPTION OF THE RELATED ART

Touch panels have been widely used in electronic products for communication and also, in computers. They have been used as input and output interfaces of numerous electronic products, such as game machines, smart phones and tablet PCs which are widely used at present. Generally, display portions of these electronic products are formed by integrating touch panels with display panels such that a user can click options on the display image by a finger or a stylus to input the action, thereby being able to input without operation of any other traditional input devices (such as buttons, keyboards or operating arms) and thus greatly improving input convenience.

The underlying working principle of a capacitive sensing touch panel is to detect coordinates of a touch location according to an induced current generated due to a capacitance change caused by electrostatic bonding between arranged transparent electrodes and a human body. Due to obvious advantages in accuracy, response time, and service life, capacitive sensing touch panels are being widely used at present.

However, due to the working principle of a capacitive sensing touch panel, only the touch location of a conductive object on the touch panel can be detected while the touch location of a non-conductive object on the touch panel cannot be detected. Thus, there exists a need to have touch panel that can not only detect touch location of a conductive object on the touch panel but also detect touch location of a non-conductive object on the touch panel.

SUMMARY OF THE DISCLOSURE

In view of the above-mentioned, the present disclosure provides a heat sensitive touch panel which detects a touch location according to a temperature change of heat sensitive blocks. The heat sensitive touch panel can not only detect touch locations of a conductive object on the touch panel but also detect touch locations of a non-conductive object on the touch panel.

According to an embodiment, a heat sensitive touch panel comprises a substrate and a sensing layer disposed on the substrate, wherein the sensing layer comprises a plurality of heat sensitive blocks and a plurality of conductive wires. The heat sensitive blocks are made of a heat sensitive material and disposed on the substrate. The conductive wires are disposed on the substrate and electrically connected with the heat sensitive blocks.

Furthermore, the heat sensitive blocks comprise a plurality of first-axis heat sensitive blocks and a plurality of second-axis heat sensitive blocks arranged in a staggered manner, wherein the plurality of first-axis heat sensitive blocks are insulated from the plurality of second-axis heat sensitive blocks.

Furthermore, the first-axis heat sensitive blocks and the second-axis heat sensitive blocks are located on two sides of the substrate respectively, and insulated from each other through the substrate.

Furthermore, the substrate further comprises a first substrate and a second substrate, wherein the first-axis heat sensitive blocks are laid on a lower surface of the first substrate, and the second-axis heat sensitive blocks are laid on a lower surface of the second substrate, and wherein the second substrate is located between the first-axis heat sensitive blocks and the second-axis heat sensitive blocks.

Furthermore, the heat sensitive touch panel further comprises an insulation layer, wherein the first-axis heat sensitive blocks are laid on the substrate and the second-axis heat sensitive blocks are laid on the insulation layer, and wherein the insulation layer is disposed between the first-axis heat sensitive blocks and the second-axis heat sensitive blocks.

Furthermore, the substrate comprises a first substrate and a second substrate. The first-axis heat sensitive blocks are disposed on a lower surface of the first substrate, and the second-axis heat sensitive blocks are disposed on an upper surface of the second substrate. A closed air layer is formed between the lower surface of the first substrate and the upper surface of the second substrate to insulate the plurality of first-axis heat sensitive blocks from the plurality of second-axis heat sensitive blocks.

Furthermore, the heat sensitive blocks comprise a plurality of first-axis heat sensitive blocks and a plurality of second-axis heat sensitive blocks disposed on the same surface of the substrate. The conductive wires comprise a plurality of mutually paralleled first-axis conductive wires and a plurality of mutually paralleled second-axis conductive wires. The sensing layer further comprises a plurality of mutually spaced insulation spacers disposed on the first-axis conductive wires. The first-axis heat sensitive blocks are disposed on the first-axis conductive wires at two sides of the insulation spacers and are serially connected by the first-axis conductive wires. The second-axis heat sensitive blocks are disposed at two sides of the first-axis conductive wires. The second-axis conductive wires stretch across the insulation spacers and serially connect the second-axis heat sensitive blocks.

Furthermore, the substrate is a cover lens.

Furthermore, the conductive wires comprise input conductive wires and output conductive wires. Each heat sensitive block is electrically connected with corresponding input conductive wire and output conductive wire.

Furthermore, the heat sensitive touch panel further comprises a shielding layer disposed on the sensing layer to avoid generating a capacitance effect between a touch object and the sensing layer.

Furthermore, the heat sensitive blocks are thin sheets made of a transparent or non-transparent material.

Furthermore, the heat sensitive blocks are formed by doping a dopant into PEDOT:PSS.

Furthermore, the dopant includes one or more than two of sorbitol, ethylene glycol (EG), N-methyl pyrrolidone (NMP) and carbon nanotube (CNT).

Besides, the present disclosure also provides a method for manufacturing a heat sensitive touch panel, wherein the method comprises a step of disposing a sensing layer on a substrate, wherein disposing the sensing layer further comprises disposing a plurality of heat sensitive blocks made of a heat sensitive material on the substrate, and disposing conductive wires on the substrate and electrically connect with the heat sensitive blocks.

Furthermore, the heat sensitive blocks comprise a plurality of first-axis heat sensitive blocks and a plurality of second-axis heat sensitive blocks disposed on the same surface of the substrate. The conductive wires comprise a plurality of mutually paralleled first-axis conductive wires and a plurality of mutually paralleled second-axis conductive wires. The step of disposing the sensing layer on the substrate further comprises: disposing the first-axis conductive wires on the substrate; disposing a plurality of insulation spacers at intervals on the first-axis conductive wires; and disposing the first-axis heat sensitive blocks, the second-axis heat sensitive blocks and the second-axis conductive wires simultaneously, wherein the first-axis heat sensitive blocks are disposed on the first-axis conductive wires at two sides of the insulation spacers and are serially connected by the first-axis conductive wires, wherein the second-axis heat sensitive blocks are disposed at two sides of the first-axis conductive wires, and wherein the second-axis conductive wires stretch across the insulation spacers and serially connect the second-axis heat sensitive blocks.

Furthermore, the heat sensitive blocks and the conductive wires are disposed simultaneously. Each heat sensitive block is electrically connected with the corresponding conductive wire.

Furthermore, the method further comprises a step of disposing a shielding layer on the heat sensitive blocks to avoid generating a capacitance effect between a touch object and the heat sensitive blocks.

Moreover, the present disclosure also provides a detecting method of a heat sensitive touch panel, wherein the detecting method comprises the following steps: driving heat sensitive blocks; detecting output signals of the heat sensitive blocks; determining whether the heat sensitive blocks have generated a temperature change according to the output signals; and outputting location of the heat sensitive block that has generated a temperature change as the touch location.

The step of determining comprises: determining the heat sensitive block, output signal change of which meets a predetermined range, as the one that has generated a temperature change.

The step of driving comprises: only driving the heat sensitive blocks in the area that can respond to the touch operation.

For the above-mentioned heat sensitive touch panel, manufacturing method and detecting method, if a finger or a dedicated stylus touches the heat sensitive touch panel, resistance of the heat sensitive blocks will change correspondingly such that the output signals generated when the touch panel is touched by the finger or the dedicated stylus are different from the output signals generated when it is not touched, thereby being able to determine the touch location. The heat sensitive touch panel can detect a touch location of a conductive object or a non-conductive object on the touch panel according to temperature change of the heat sensitive blocks.

DETAILED DESCRIPTION OF THE EMBODIMENTS

The following embodiments provide a heat sensitive touch panel comprising a substrate and a sensing layer disposed on the substrate. The sensing layer disposed on the substrate, can be entirely or partially disposed on the substrate (another part of the sensing layer can be disposed on the insulation layer). The sensing layer comprises heat sensitive blocks and conductive wires. The heat sensitive blocks are made of heat sensitive, materials and disposed on the substrate, and the conductive wires connect with the heat sensitive blocks.

If the heat sensitive touch panel is touched by fingers or a dedicated stylus, resistance of the heat sensitive blocks would change correspondingly, such that output signals generated when the touch panel is touched by fingers or a dedicated stylus differ from the output signals generated when it is not touched, thereby being able to determine the touch locations. The heat sensitive touch panel can detect the touch locations of conductive objects, and also non-conductive objects on the touch panel according to temperature changes of the heat sensitive blocks. The specific structures of the heat sensitive touch panel in accordance with each embodiments of the present disclosure are described in detail below.

Figure 1A:
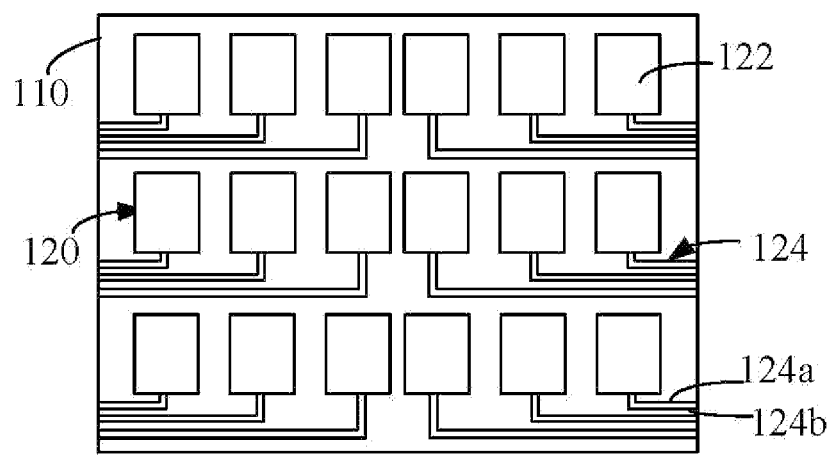
FIG. 1A is a schematic front view of a heat sensitive touch panel in accordance with a first embodiment.
Figure 1B:
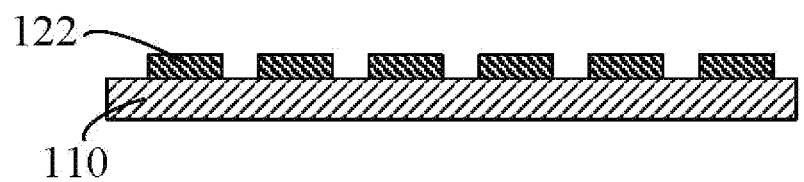
FIG. 1B is a schematic section view according to the section line I-I' in FIG. 1A.

FIG. 1A is a schematic front view of a heat sensitive touch panel in accordance with a first embodiment. FIG. 1B is a schematic section view according to the section line I-I' in FIG. 1A. As shown in FIG. 1A and FIG. 1B, a heat sensitive touch panel 100 provided in the present embodiment comprises a substrate 110 and a sensing layer 120 disposed on the substrate 110.

The sensing layer 120 comprises heat sensitive blocks 122 and conductive wires 124. The heat sensitive blocks 122 are made of a heat sensitive material and disposed on the substrate 110, especially disposed on the substrate 110 in arrays. The conductive wires 124 are disposed on the substrate 110 and electrically connect with the heat sensitive blocks 122. The conductive wires 124 include input conductive wires 124a and output conductive wires 124b. The input conductive wires 124a are used to input or receive driving signals and the output conductive wires 124a are used to output sensing signals. Each heat sensitive block 122 at least electrically connects with an input conductive wire 124a and an output conductive wire 124b. Further, the conductive wires 124 connect the heat sensitive blocks 122 with a controller (not shown) to send the signals generated by the heat sensitive blocks 122 to the controller. Through calculation of the controller, the touch location can be determined.

When the heat sensitive touch panel 100 is working, the following steps are performed: first, inputting driving signals through the input conductive wires 124a and driving the heat sensitive blocks 122 disposed on the substrate 110; next, detecting output signals of the output conductive wires 124b that connect the heat sensitive blocks 122; then, determining if the heat sensitive blocks 122 have generated a temperature change according to the output signals; and finally, outputting locations of the heat sensitive blocks 122 that have generated a temperature change as the touch locations. Since the heat sensitive blocks 122 are made of a heat sensitive material with a high temperature coefficient of resistance, if a finger or a dedicated stylus touches the heat sensitive touch panel 100, resistance of the heat sensitive blocks 122 will change correspondingly such that the output signals generated when the touch panel is touched by a finger or a dedicated stylus are different from the output signals generated when it is not touched. Usually, area of a touch point is comparatively large, and thus quantity of the heat sensitive blocks 122 that have generated a temperature change is also comparatively large. Through calculation, the touch location can finally be determined, for example, by calculating the center of the heat sensitive blocks 122 that have generated a temperature change such that the center is determined as the touch location. In the above embodiment, the heat sensitive touch panel 100 determines the touch location according to the temperature change of the heat sensitive blocks 122 and can further detect touch locations of a conductive object (such as a finger) or a non-conductive object (such as a dedicated stylus) on the touch panel.

In the present embodiment, each heat sensitive block 122 is electrically connected with the controller via the corresponding input conductive wire 124a and output conductive wire 124b. The structure is simple thereby making it relatively simple to detect touch points by only needing to detect each heat sensitive block 122 separately. Moreover, the heat sensitive blocks 122 are separated from each other, thereby being able to achieve multi-point touch detection.

Figure 1C:
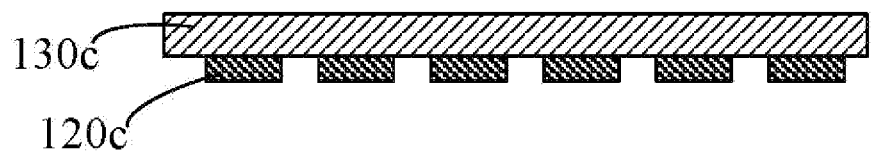
FIG. 1C is a schematic section view of a heat sensitive touch panel in accordance with a second embodiment.

FIG. 1C is a schematic section view of a heat sensitive touch panel in accordance with a second embodiment. As shown in FIG. 1C, in the present embodiment, the substrate is a cover lens 130c, and the heat sensitive touch panel comprises the cover lens 130c and a sensing layer 120c disposed on the cover lens 130c. The touch panel shown in FIG. 1A and FIG. 1B generally needs to dispose a cover lens on the sensing layer 120 (not shown in FIG. 1A and FIG. 1B) for protecting the sensing layer 120 from corrosion by environment. In the present embodiment, the sensing layer 120c is directly disposed on the cover lens 130c to make the cover lens 130c as a substrate for carrying the sensing layer 120c and a cover layer for protecting the sensing layer 120c, so as to omit the substrate 110 in FIG. 1A and FIG. 1B, simplify the structure and save costs. The structure of the sensing layer 120c of the present embodiment is same as that of FIG. 1A and FIG. 1B, and is not described here again.

Figure 2A:
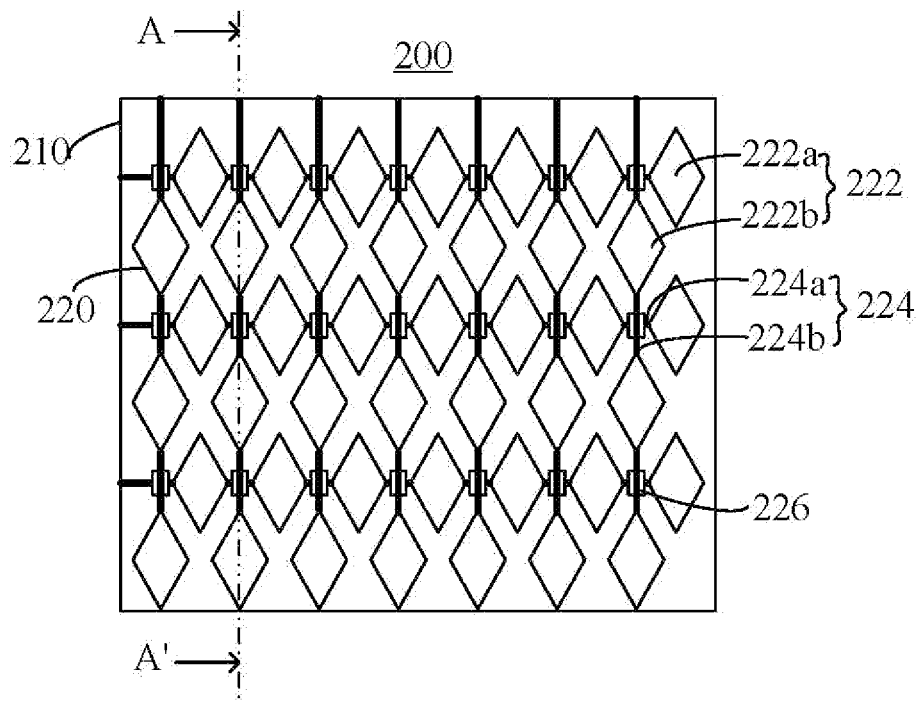
FIG. 2A is a schematic front view of a heat sensitive touch panel in accordance with a third embodiment.
Figure 2B:
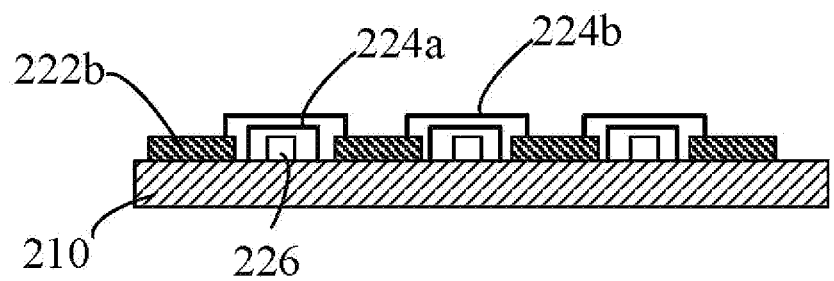
FIG. 2B is a schematic section view according to the section line A-A' in FIG. 2A.

FIG. 2A is a schematic front view of a heat sensitive touch panel in accordance with a third embodiment of the present disclosure. FIG. 2B is a schematic section view according to the section line A-A' in FIG. 2A. As shown in FIG. 2A and FIG. 2B, in the present embodiment, a heat sensitive touch panel 200 comprises a substrate 210 and a sensing layer 220 disposed on the substrate 210.

The sensing layer 220 comprises heat sensitive blocks 222 and conductive wires 224. The heat sensitive blocks 222 are made of a heat sensitive material and disposed on the substrate 210. The heat sensitive blocks 222 comprise a plurality of first-axis heat sensitive blocks 222a and a plurality of second-axis heat sensitive blocks 222b, wherein the plurality of first-axis heat sensitive blocks 222a and the plurality of second-axis heat sensitive blocks 222b are disposed on the same surface of the substrate 210.

The conductive wires 224 are disposed on the substrate 210 and electrically connect with the heat sensitive blocks 222. The conductive wires 224 comprise a plurality of mutually paralleled first-axis conductive wires 224a and a plurality of mutually paralleled second-axis conductive wires 224b. Further, the conductive wires 224 connect the heat sensitive blocks 222 with a controller (not shown) to send the signals generated by the heat sensitive blocks 222 to the controller. Through calculation of the controller, the touch location can be determined.

In the present embodiment, the sensing layer 200 further comprises a plurality of mutually spaced insulation spacers 226 disposed on the first-axis conductive wires 224a. The first-axis heat sensitive blocks 222a are disposed at two sides of the insulation spacers 226 and are serially connected by the first-axis conductive wires 224a. The second-axis heat sensitive blocks 222b are disposed at two sides of the first-axis conductive wires 224a. The second-axis conductive wires 224b stretch across the insulation spacers 226 and serially connect the second-axis heat sensitive blocks 222b. Further, the first-axis conductive wires 224a are perpendicular to the second-axis conductive wires 224b, or intersect with the second-axis conductive wires 224b at a certain angle, but it is not limited thereto.

Figure 2C:
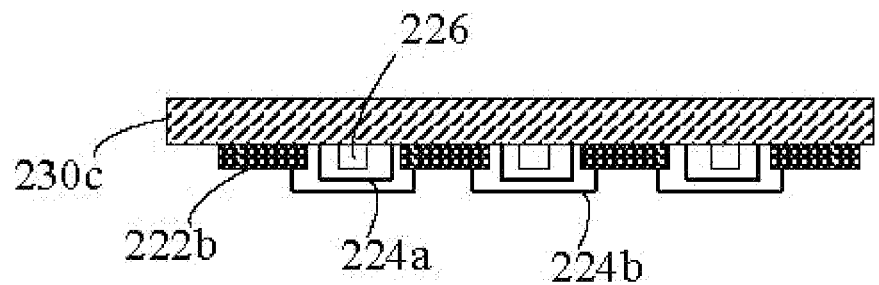
FIG. 2C is a schematic section view of a heat sensitive touch panel in accordance with a fourth embodiment.

FIG. 2C is a schematic section view of a heat sensitive touch panel in accordance with a fourth embodiment. As shown in FIG. 2C, in the present disclosure, the substrate is a cover lens 230c. The first-axis heat sensitive blocks 222a and the first-axis conductive wires 224a are disposed on the cover lens 230c. The touch panel shown in FIG. 2A and FIG. 2B generally needs to dispose a cover lens on the sensing layer 220 (not shown in FIG. 2A and FIG. 2B) for protecting the sensing layer 220 from corrosion by environment. In the present embodiment, the sensing layer 220c is directly disposed on the cover lens 230c to make the cover lens 130c as a substrate for carrying the sensing layer 220c and a cover layer for protecting the sensing layer 220c, so as to omit the substrate 210 of FIG. 2A and FIG. 2B, simplify the structure and save costs. The structure of the sensing layer 220 of the present embodiment is same as that of FIG. 2A and FIG. 2B, and is not described here again.

Although structures of the above third and fourth embodiments are more complicated than the structure of the embodiment shown in FIG. 1A, the structures are favorable for reducing number of the controller's ports and improving disposition density of the heat sensitive blocks 222, thereby improving touch resolution of the heat sensitive touch panel 200.

Figure 3A:
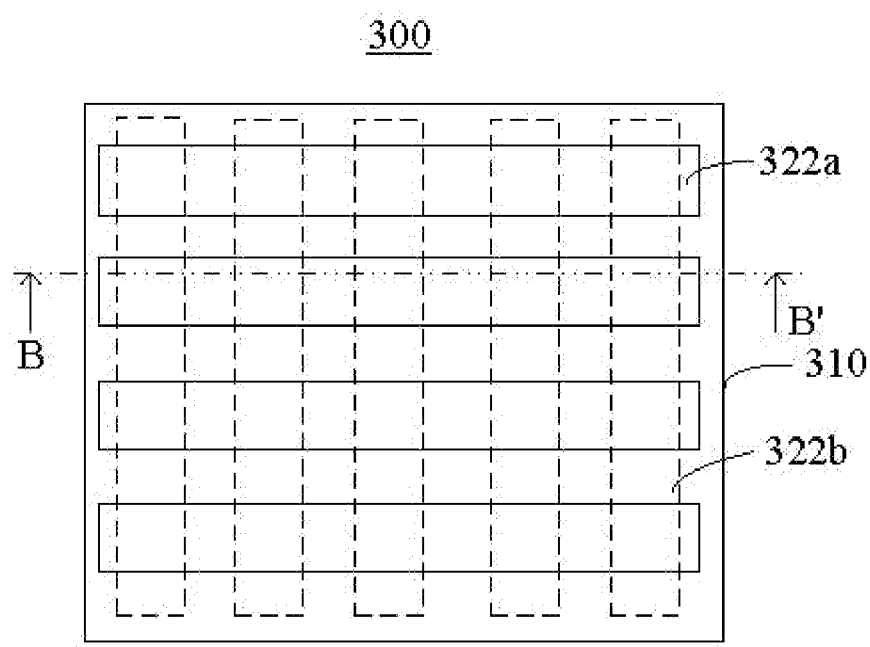
FIG. 3A is a schematic front view of a heat sensitive touch panel in accordance with a fifth embodiment.
Figure 3B:
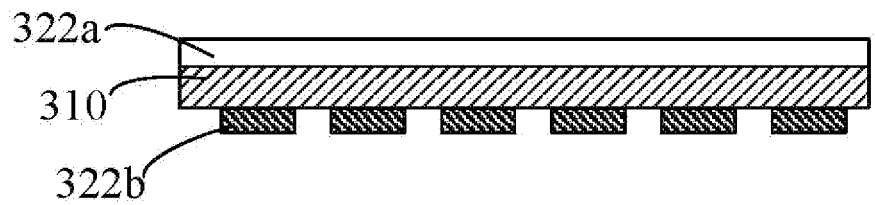
FIG. 3B is a schematic section view according to the section line B-B' in FIG. 3A.

FIG. 3A is a schematic front view of a heat sensitive touch panel in accordance with a fifth embodiment. FIG. 3B is a schematic section view according to the section line B-B' in FIG. 3A. As shown in FIG. 3A and FIG. 3B, the heat sensitive touch panel 300 comprises a substrate 310, a plurality of first-axis heat sensitive blocks 322a, a plurality of second-axis heat sensitive blocks 322b, a plurality of first-axis wires 324a and a plurality of second-axis wires 324b. The first-axis heat sensitive blocks 322a and the second-axis heat sensitive blocks 322b are arranged on both sides of the substrate 310 in a staggered or interlaced manner and spaced from each other through the substrate 310. In other embodiments, the first-axis heat sensitive blocks 322a can also be formed by connecting the first-axis heat sensitive blocks 222a shown in FIG. 2A through the first conductive wires 224a, and the second-axis heat sensitive blocks 322b can also be formed by connecting the second-axis heat sensitive blocks 222b shown in FIG. 2B through the second conductive wires 224b.

Figure 3C:
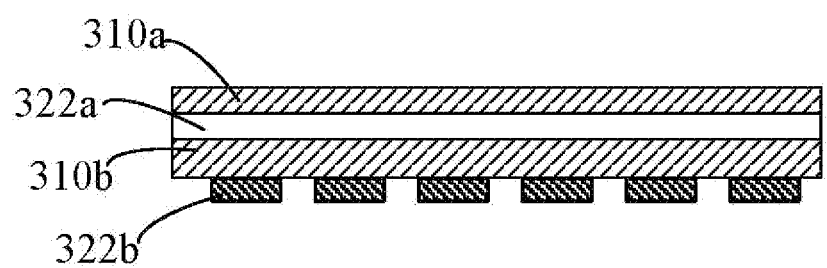
FIG. 3C is a schematic section view of a heat sensitive touch panel in accordance with a sixth embodiment.

FIG. 3C is a schematic section view of a heat sensitive touch panel in accordance with a sixth embodiment. As shown in FIG. 3C, in the present embodiment, another substrate is added on the first-axis heat sensitive blocks 322a of the embodiment shown in FIG. 3A. The heat sensitive touch panel comprises a first substrate 310a and a second substrate 310b, the first-axis heat sensitive blocks 322a can be directly disposed on a lower surface of the first substrate 310a, and the second-axis heat sensitive blocks 322b are disposed on a lower surface of the second substrate 310b, the first-axis heat sensitive blocks 322a are spaced from the second-axis heat sensitive blocks 322b through the second substrate 310b. In another embodiment, the first substrate 310a can be a cover lens. In other embodiments, the first substrate 310a can be a cover lens contacted by a touching object, such as in the above second embodiment and forth embodiment, so as to omit the substrate 310 in FIG. 3B, thereby simplifying the structure and reducing costs.

Figure 4A:
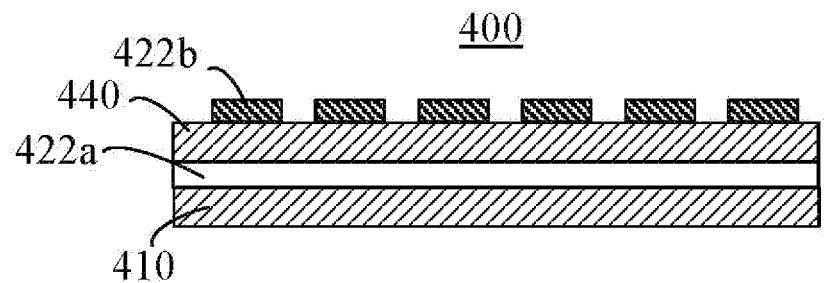
FIG. 4A is a schematic section view of a heat sensitive touch panel in accordance with a seventh embodiment.

FIG. 4A is a schematic section view of a heat sensitive touch panel in accordance with a seventh embodiment. As shown in FIG. 4A, the heat sensitive touch panel 400 comprises a substrate 410, a plurality of first-axis heat sensitive blocks 422a, a plurality of second-axis heat sensitive blocks 422b and an insulation layer 440. The first-axis heat sensitive blocks 422a are disposed on the substrate 410. The second-axis heat sensitive blocks 422b are disposed on the insulation layer 440. Compared with the embodiment shown in FIG. 3A, the difference is that, the plurality of first-axis heat sensitive blocks 422a and the plurality of second-axis heat sensitive blocks 422b are spaced from each other through the insulation layer 440. Namely, the insulation layer 440 is used as an entire layer to space the first-axis heat sensitive blocks 422a on one side of the insulation layer 440 and the second-axis heat sensitive blocks 422b on the other side of the insulation layer 440.

Figure 4B:
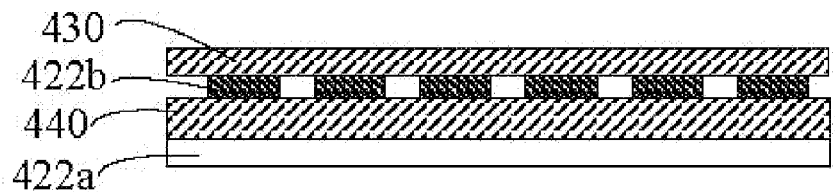
FIG. 4B is a schematic section view of a heat sensitive touch panel in accordance with an eighth embodiment.

FIG. 4B is a schematic section view of a heat sensitive touch panel in accordance with an eighth embodiment. As shown in FIG. 4B, in the present embodiment, the difference from the embodiment shown in FIG. 4A is that, the second-axis heat sensitive blocks 422a are directly disposed on a cover lens 430 for omitting the substrate 410 in FIG. 4A. The first-axis heat sensitive blocks 422a and the second-axis heat sensitive blocks 422b are spaced from each other through the insulation layer 440.

Figure 5:
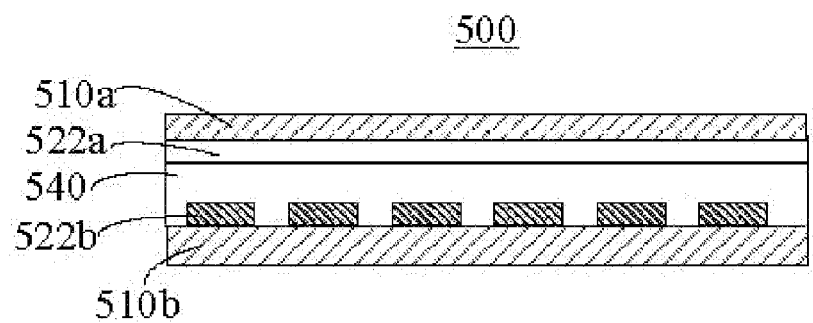
FIG. 5 is a schematic section view of a heat sensitive touch panel in accordance with a ninth embodiment.

FIG. 5 is a schematic section view of a heat sensitive touch panel in accordance with a ninth embodiment of the present disclosure. As shown in FIG. 5, in the present embodiment, the heat sensitive touch panel 500 comprises a first substrate 510a, a plurality of first-axis heat sensitive blocks 522a, a closed air layer 540, a plurality of second-axis heat sensitive blocks 522b and a second substrate 510b. The first-axis heat sensitive blocks 522a are disposed on a lower surface of the first substrate 510a. The second-axis heat sensitive blocks 522b are disposed on an upper surface of the second substrate 510b. The closed air layer 540 is formed between the lower surface of the first substrate 510a and the upper surface of the second substrate 510b to insulate the plurality of first-axis heat sensitive blocks 522a from the plurality of second-axis heat sensitive blocks 522b. The arrangement of the plurality of first-axis heat sensitive blocks 522a and the plurality of second-axis heat sensitive blocks 522b is same as that in FIG. 3A. In another embodiment, the first substrate 510a can be a cover lens.

When the above heat sensitive touch panel is working, the heat sensitive blocks 222 can be detected row by row first and column by column later, or column by column first and row by row later, or row by row and column by column simultaneously, or over all rows and columns simultaneously. The detecting method depends on the processing ability of the controller. Multi-point touch detection can also be achieved. First, output signals of the conductive wires 224 that connect with the heat sensitive blocks 222 are detected, and then it is determined if the row or column of the heat sensitive blocks 222 have generated a temperature change according to the output signals. Since several heat sensitive blocks 222 around the touch point will simultaneously generate a temperature change when the touch panel is touched, namely the heat sensitive blocks 222 in the adjacent row and column will simultaneously generate a temperature change, the position at the intersection of the row and column of the heat sensitive blocks 222 that have generated a temperature change is identified as the touch location. Specifically, the heat sensitive blocks 222 of same row or column is serially connected by the conductive wires 224, for example, input voltage is V1, resistance of each heat sensitive block 222 is Rn, there are totally n heat sensitive blocks in a same row or column, and the electric current passed through a same row is I, then output voltage V2 equals to V1−I*(R1+R2+R3+ . . . +Rn). Changes in the resistance of a certain heat sensitive block 222 due to temperature change would cause output voltage of the row or column located by the heat sensitive blocks 222 to change. Temperature change of the row and column is determined by scanning each row or column, and the touch location can be determined according to intersection of the row and column.

Figure 6:
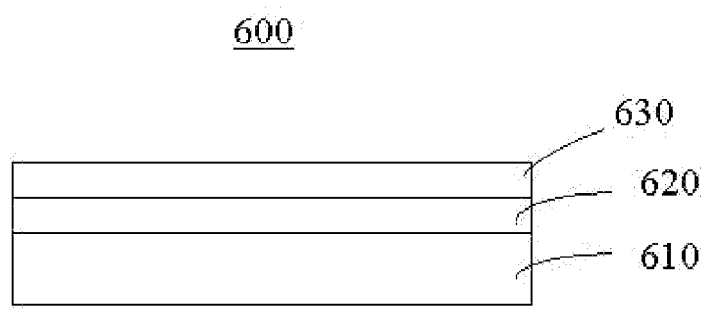
FIG. 6 is a schematic side view of a heat sensitive touch panel in accordance with a tenth embodiment.

FIG. 6 is a schematic side view of a heat sensitive touch panel in accordance with a tenth embodiment. As shown in FIG. 6, in the present embodiment, a heat sensitive touch panel 600 comprises a substrate 610 and a sensing layer 620 disposed on the substrate 610. Structures of the substrate 610 and the sensing layer 620 are the same as the structures shown in FIG. 1A to FIG. 5. In the present embodiment, the heat sensitive touch panel 600 further comprises a shielding layer 630 disposed on the sensing layer 620 to avoid generating a capacitance effect between a touch object and the sensing layer 620. If the touch object is a conductor, and driving signal is an alternating current, such as pulse signal or sine wave signal, a coupling capacitance will generate between the touch object and a heat sensitive block of the sensing layer 620, additionally, resistance of the heat sensitive block will change due to the temperature of the touch object. In order to avoid the coupling capacitance from interfering with output signal of the heat sensitive block, a shielding layer 630 may need to be disposed on the sensing layer 620 of the embodiments shown in FIG. 1A and FIG. 2A such that coupling capacitance formed between the touch object and the heat sensitive blocks will reduce or eliminate impact on detecting signals through the shielding layer 630, so as to increase accuracy in the detection.

Figure 7:
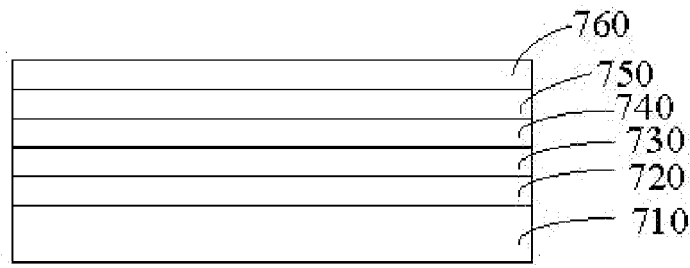
FIG. 7 is a schematic side view of a heat sensitive touch panel in accordance with a eleventh embodiment.

FIG. 7 is a schematic side view of a heat sensitive touch panel in accordance with an eleventh embodiment. As shown in FIG. 7, in the present embodiment, a heat sensitive touch panel 700 comprises a substrate 710, a sensing layer 720 disposed on the substrate 410, a shielding layer 730 disposed on the sensing layer 720 to avoid generating a capacitance effect between a touch object and the sensing layer 720, a bonding layer 740 that has a bonding function, a protection layer 750 that protects the sensing layer 720, and an antireflective coating layer 760 that prevents the heat sensitive touch panel 400 from reflecting, wherein structure of the sensing layer 720 is the same as the structure as shown in FIG. 1A or FIG. 2A.

Moreover, a method for manufacturing a heat sensitive touch panel is provided in the present disclosure, wherein the method comprises a step of disposing a sensing layer on a substrate, wherein the sensing layer comprises heat sensitive blocks and conductive wires. Specifically, the method comprises the steps of disposing heat sensitive blocks on the substrate and disposing conductive wires on the substrate. The heat sensitive blocks are made of a heat sensitive material. The conductive wires electrically connect to the heat sensitive blocks.

For the heat sensitive touch panel manufactured by the above method, since the heat sensitive blocks are made of a heat sensitive material having a high temperature coefficient of resistance, if a finger or a dedicated stylus touches the heat sensitive touch panel, the temperature of the heat sensitive blocks changes, so as to the resistance of the heat sensitive blocks will change correspondingly such that the output signals generated when the touch panel is touched by a finger or a dedicated stylus are different from the output signals generated when it is not touched, thereby enabling to determine the touch locations. The detecting method of the heat sensitive touch panel determining the touch location according to temperature change of the heat sensitive blocks can detect the touch locations of conductive objects and also non-conductive objects on the touch panel.

The method for manufacturing the heat sensitive touch panel further comprises a step of disposing a shielding layer on the sensing layer to avoid generating a capacitance effect between a touch object and the heat sensitive blocks. By disposing a shielding layer on the heat sensitive blocks, coupling capacitance will not be generated between the touch object and the heat sensitive blocks, thereby avoiding the coupling capacitance from interfering with the electrical signals. After the interference is eliminated, mis-operation can be further avoided.

In a specific embodiment, the heat sensitive blocks are made of a heat sensitive material and disposed on the substrate in arrays. Each heat sensitive block connects with a controller (not shown) through corresponding conductive wires (As shown in FIG. 1A and FIG. 1B). The step of disposing the sensing layer on the substrate further comprises disposing the sensing layer and the conductive wires at the same time. In other embodiment, the sensing layer and the conductive wires can be disposing in different steps. The structure formed in present embodiment is simple thereby making it relatively simple to detect touch points, only needing to detect each heat sensitive block separately. When the substrate is a cover lens (as shown in FIG. 1C), the step of forming the sensing layer is substantially the same as in the present embodiment.

In a specific embodiment, the sensing layer further comprises a plurality of mutually spaced insulation spacers. The heat sensitive blocks comprise a plurality of first-axis heat sensitive blocks and a plurality of second-axis heat sensitive blocks disposed on the same surface of the substrate. The conductive wires comprise a plurality of mutually paralleled first-axis conductive wires and a plurality of mutually paralleled second-axis conductive wires (As shown in FIG. 2A and FIG. 2B). The step of disposing the sensing layer on the substrate comprises: disposing the first-axis conductive wires on the substrate; disposing a plurality of insulation spacer at intervals on the first-axis conductive wires; and disposing the first-axis heat sensitive blocks, the second-axis heat sensitive blocks and the second-axis conductive wires simultaneously. The first-axis heat sensitive blocks are disposed at two sides of the insulation spacers and are serially connected by the first-axis conductive wires. The second-axis heat sensitive blocks are disposed at two sides of the first-axis conductive wires. The second-axis conductive wires stretch across the insulation spacers and serially connect the second-axis heat sensitive blocks. Besides, in another embodiment, the first-axis conductive wires can be formed together with the first-axis heat sensitive blocks and the second-axis heat sensitive blocks. If the first-axis heat sensitive blocks, the second-axis heat sensitive blocks and the first-axis conductive wires are formed simultaneously, wherein the first-axis conductive wires serially connect the first-axis heat sensitive blocks, then a plurality of insulation spacers are formed at intervals on the first-axis conductive wires, and the second-axis conductive wires are formed on the insulation spacers to connect the second-axis heat sensitive blocks. The structure of the heat sensitive touch panel manufactured in the present embodiment can reduce the number of the controller's ports and improve the disposition density of the heat sensitive blocks, thereby improving touch resolution of the heat sensitive touch panel. When the substrate is a cover lens (as shown in FIG. 2C), the step of forming the sensing layer is substantially the same as in the present embodiment.

In a specific embodiment, the heat sensitive blocks comprise a plurality of first-axis heat sensitive blocks and a plurality of second-axis heat sensitive blocks arranged on both sides of the substrate in a staggered manner and spaced each other through the substrate (as shown in FIG. 3A and FIG. 3B). The step of disposing the sensing layer on the substrate comprises: disposing the first-axis heat sensitive blocks on one side of the substrate; disposing the second-axis heat sensitive blocks on the other side of the substrate, wherein the first-axis heat sensitive blocks and the second-axis heat sensitive blocks are disposed on the opposite sides of the substrate in a staggered manner.

In a specific embodiment, the substrate comprises a first substrate and a second substrate. The heat sensitive blocks comprise a plurality of first-axis heat sensitive blocks and a plurality of second-axis heat sensitive blocks arranged in a staggered manner (as shown in FIG. 3C). The step of disposing the sensing layer on the substrate comprises: disposing the first-axis heat sensitive blocks on a lower surface of the first substrate; disposing the second-axis heat sensitive blocks on a lower surface of the second substrate, wherein the first-axis heat sensitive blocks are insulated from the second-axis heat sensitive blocks through the second substrate. In other embodiment, the first substrate is a cover lens.

In a specific embodiment, the heat sensitive blocks comprise a plurality of first-axis heat sensitive blocks and a plurality of second-axis heat sensitive blocks arranged in a staggered manner (as shown in FIG. 4A). The step of disposing the sensing layer on the substrate comprises: disposing the first-axis heat sensitive blocks on the substrate; disposing an insulation layer on the first-axis heat sensitive blocks; and disposing the second-axis heat sensitive blocks on the insulation layer. The first-axis heat sensitive blocks and the second-axis heat sensitive blocks are spaced from each other through the insulation layer.

In a specific embodiment, the heat sensitive blocks comprise a plurality of first-axis heat sensitive blocks and a plurality of second-axis heat sensitive blocks arranged in a staggered manner (as shown in FIG. 4B). The step of disposing the sensing layer on the substrate comprises: disposing the second-axis heat sensitive blocks on a cover lens; disposing an insulation layer on the first-axis heat sensitive blocks; and disposing the second-axis heat sensitive blocks on the insulation layer. The first-axis heat sensitive blocks and the second-axis heat sensitive blocks are spaced from each other through the insulation layer.

In a specific embodiment, the substrate comprises a first substrate and a second substrate. The heat sensitive blocks comprise a plurality of first-axis heat sensitive blocks and a plurality of second-axis heat sensitive blocks arranged in a staggered manner (as shown in FIG. 5). The step of disposing the sensing layer on the substrate comprises: disposing the first-axis heat sensitive blocks on a lower surface of the first substrate; disposing the second-axis heat sensitive blocks on an upper surface of the second substrate; and laminating the lower surface of the first substrate to the upper surface of the second substrate such that a closed air layer is formed between the first substrate and the second substrate. In other embodiment, the first substrate is a cover lens.

Figure 8:
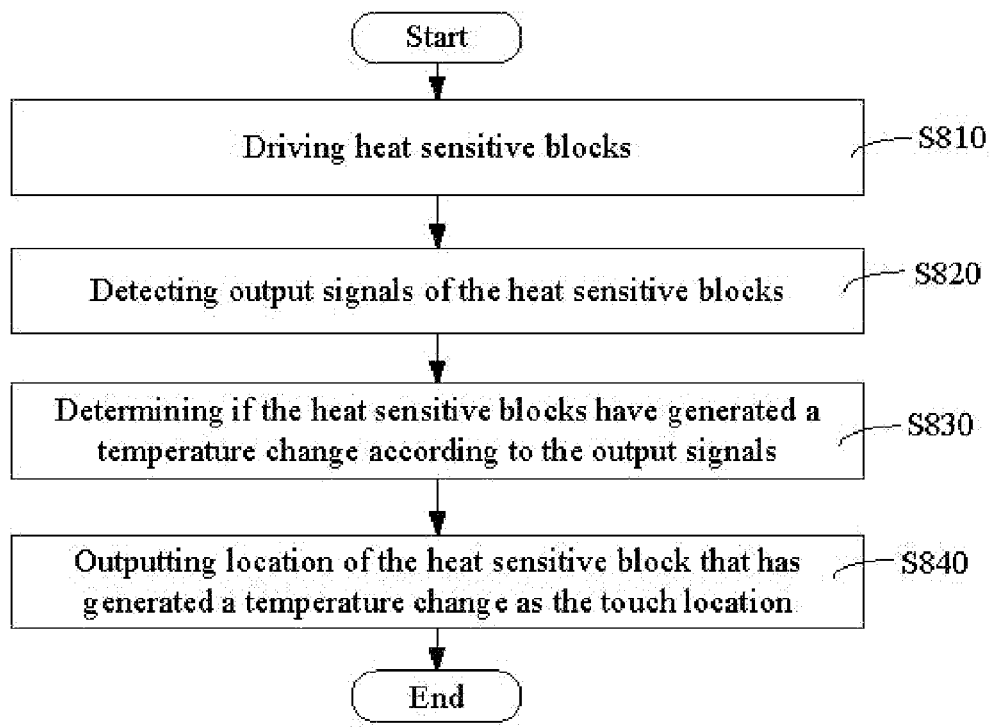
FIG. 8 is a flowchart of a detecting method of a heat sensitive touch panel in accordance with an embodiment of the present disclosure.

FIG. 8 is a flowchart of a detecting method of a heat sensitive touch panel in accordance with an embodiment of the present disclosure. The detecting method comprises the following steps: Step S810, driving heat sensitive blocks. The driving mode can be applying voltage or current signals to the heat sensitive blocks. The heat sensitive blocks can be disposed on the substrate by any of the arrangement mode shown in FIG. 1A to FIG. 5. Step S820: detecting output signals of the heat sensitive blocks. This step can be achieved by means of the input ports of the controller receiving signals generated by the heat sensitive blocks and then the controller further performing analog-to-digital conversion of the signals. Step S830: determining if the heat sensitive blocks have generated a temperature change according to the output signals, for example, by comparing signals generated by the heat sensitive blocks with a predetermined range or comparing the values after analog-to-digital conversion with the pre-stored values. Further, the step of determining if the heat sensitive blocks have generated a temperature change according to the output signals comprises: determining the heat sensitive block, output signal change of which meets a predetermined range, as the one that has generated a temperature change, but undersize or oversize changes can be ignored, thereby being able to avoid mis-operation. Step S840: outputting location of the heat sensitive block that has generated a temperature change as the touch location. Since the heat sensitive blocks are made of a heat sensitive material, if a finger or other object that has a temperature meeting the predetermined temperature range touches the touch panel, resistance of the heat sensitive blocks will change, and the resistance change will in turn influence the signals correspondingly. It can be determined if there is a temperature change according to the influence, and then location of the heat sensitive block that has generated a temperature change is determined as the touch location.

For the above detecting method of the heat sensitive touch panel, if a finger or a dedicated stylus touches the touch panel, resistance of the heat sensitive blocks will change correspondingly such that the output signals generated when the touch panel is touched by a finger or a dedicated stylus are different from the output signals generated when it is not touched, thereby enabling to determine the touch location. For the detecting method, the heat sensitive touch panel can determine the touch location according to temperature change of the heat sensitive blocks. The heat sensitive touch panel can detect one or more touch locations of a conductive object or a non-conductive object on the touch panel, and will only report the touch point(s) of a touch object that has a temperature changing meeting the predetermined temperature range and, will not make any response to a touch object that does not meet the predetermined temperature range.

Further, in the above detecting method, the step of driving the heat sensitive blocks is: only driving the heat sensitive blocks in the area that can respond to the touch operation. For example, in a display interface of a touch panel, it can be set that a controller can only respond to the touch operation at two positions in the display interface but not respond to the touch operation at other positions even if touch points are reported by the touch panel. The step of only driving the heat sensitive blocks in the area that can respond to the touch operation can save the electricity consumed for driving and/or can increase the detecting frequency.

In all above embodiments, the substrate and the cover lens can be made of glass, polymethylmetlhacrylate (PMMA), polyvinylchloride (PVC), polypropylene (PP), polyethylene terephthalate (PET), polyethylene naphthalate (PEN), polycarbonate (PC), polystyrene (PS) and other transparent or non-transparent insulation materials. The heat sensitive blocks can be thin sheets made of transparent or non-transparent materials. Shapes of the heat sensitive blocks can include, but not limited to, rhombus, regular hexagon, square, circle or rectangle. The heat sensitive blocks can be formed by doping a dopant into PEDOT:PSS. The dopant can include one or more than two of sorbitol, ethylene glycol (EG), N-methyl pyrrolidone (NMP) and carbon nanotube (CNT). The conductive wires can be made of metal, indium tin oxide (ITO) or carbon nanotube (CNT). In general, the insulation layer of the above embodiment needs better thermal conductivity, and can be made of Polyphenylene sulfide (PPS), Polysulfone (PSF), Boron nitride (BN), Aluminum nitride (AlN), Silicon nitride (Si3N4), Silicone and other modified materials, organic, inorganic and composite materials.

While certain embodiments have been shown and described, various modifications and substitutions may be made thereto without departing from the spirit and scope of the disclosure. Therefore, it is to be understood that the present disclosure has been described by way of illustration and not limitations.

What is claimed is:

1. A heat sensitive touch panel, comprising a substrate and a sensing layer disposed on the substrate, wherein the sensing layer comprises:
    heat sensitive blocks made of a heat sensitive material and disposed on the substrate, the heat sensitive blocks comprise a plurality of first-axis heat sensitive blocks and a plurality of second-axis heat sensitive blocks disposed on the same surface of the substrate;
    conductive wires disposed on the substrate and electrically connected to the heat sensitive blocks, wherein the conductive wires comprise a plurality of mutually paralleled first-axis conductive wires and a plurality of mutually paralleled second-axis conductive wires; and
    a plurality of mutually spaced insulation spacers disposed on the first-axis conductive wires, wherein the first-axis heat sensitive blocks are disposed at two sides of the insulation spacers and are serially connected by the first-axis conductive wires, wherein the second-axis heat sensitive blocks are disposed at two sides of the first-axis conductive wires, and wherein the second-axis conductive wires stretch across the insulation spacers and serially connect the second-axis heat sensitive blocks.

2. The heat sensitive touch panel as claimed in claim 1, wherein the first-axis heat sensitive blocks and the second-axis heat sensitive blocks arranged in a staggered manner, and wherein the first-axis heat sensitive blocks are insulated from the second-axis heat sensitive blocks.

3. The heat sensitive touch panel as claimed in claim 1, wherein the substrate is a cover lens.

4. The heat sensitive touch panel as claimed in claim 1, wherein the conductive wires comprise input conductive wires and output conductive wires, and wherein each heat sensitive block is electrically connected with the corresponding input conductive wire and output conductive wire.

5. The heat sensitive touch panel as claimed in claim 1, further comprising a shielding layer disposed on the sensing layer to avoid generating a capacitance effect between a touch object and the sensing layer.

6. The heat sensitive touch panel as claimed in claim 1, wherein the heat sensitive blocks are thin sheets made of transparent or non-transparent materials.

7. The heat sensitive touch panel as claimed in claim 1, wherein the heat sensitive blocks are formed by doping a dopant into PEDOT:PSS.

8. The heat sensitive touch panel as claimed in claim 7, wherein the dopant includes one or more than two of sorbitol, ethylene glycol (EG), N-methyl pyrrolidone (NMP) and carbon nanotube (CNT).

9. A method for manufacturing a heat sensitive touch panel, comprising:
    disposing a sensing layer on a substrate, wherein disposing the sensing layer further comprises:
    disposing heat sensitive blocks made of a heat sensitive material on the substrate,
    wherein the heat sensitive blocks comprise a plurality of first-axis heat sensitive blocks and a plurality of second-axis heat sensitive blocks disposed on the same surface of the substrate,
    wherein the step of disposing the sensing layer on the substrate comprises:
    disposing conductive wires on the substrate and electrically connecting the conductive wires with the heat sensitive blocks, wherein the conductive wires comprise a plurality of mutually paralleled first-axis conductive wires and a plurality of mutually paralleled second-axis conductive wires, wherein the step of disposing conductive wires on the substrate and electrically connecting the conductive wires with the heat sensitive block comprising:
    disposing the first-axis conductive wires on the substrate;
    disposing a plurality of insulation spacers at intervals on the first-axis conductive wires;
    disposing the first-axis heat sensitive blocks, the second-axis heat sensitive blocks and the second-axis conductive wires simultaneously; and
wherein the first-axis heat sensitive blocks are disposed at two sides of the insulation spacers and are serially connected by the first-axis conductive wires,
    wherein the second-axis heat sensitive blocks are disposed at two sides of the first-axis conductive wires, and
    wherein the second-axis conductive wires stretch across the insulation spacers and serially connect the second-axis heat sensitive blocks.

10. The method for manufacturing the heat sensitive touch panel as claimed in claim 9, wherein the heat sensitive blocks and the conductive wires are disposed simultaneously, and wherein each heat sensitive block is electrically connected with the corresponding conductive wire.

11. The method for manufacturing the heat sensitive touch panel as claimed in claim 9, further comprising a step of disposing a shielding layer on the heat sensitive blocks to avoid generating a capacitance effect between a touch object and the heat sensitive blocks.

12. A detecting method by a controller of a heat sensitive touch panel, comprising the following steps of:
    driving heat sensitive blocks only in an area that can respond to a touch operation;
    detecting output signals of the heat sensitive blocks;
    determining if the heat sensitive blocks have generated a temperature change according to the output signals; and
    outputting location of the heat sensitive block that has generated a temperature change as a touch location;
    wherein the heat sensitive touch panel further comprises: a substrate and a sensing layer disposed on the substrate,
    wherein the sensing layer comprises: heat sensitive blocks made of a heat sensitive material and disposed on the substrate,
    the heat sensitive blocks comprise a plurality of first-axis heat sensitive blocks and a plurality of second-axis heat sensitive blocks disposed on the same surface of the substrate;
    a conductive wires disposed on the substrate and electrically connected to the heat sensitive blocks, wherein the conductive wires comprise a plurality of mutually paralleled first-axis conductive wires and a plurality of mutually paralleled second-axis conductive wires; and
    a plurality of mutually spaced insulation spacers disposed on the first-axis conductive wires,
    wherein the first-axis heat sensitive blocks are disposed at two sides of the insulation spacers and are serially connected by the first-axis conductive wires,
    wherein the second-axis heat sensitive blocks are disposed at two sides of the first-axis conductive wires, and
    wherein the second-axis conductive wires stretch across the insulation spacers and serially connect the second-axis heat sensitive blocks.

13. The detecting method as claimed in claim 12, wherein the step of determining comprises: determining the heat sensitive block, output signal change of which meets a predetermined range, as the one that has generated a temperature change.

14. A heat sensitive touch panel, comprising:
    a substrate comprising a first substrate and a second substrate; and
    a sensing layer disposed on the substrate, wherein the sensing layer comprises:
    heat sensitive blocks made of a heat sensitive material and disposed on the substrate, wherein the heat sensitive blocks comprise a plurality of first-axis heat sensitive blocks and a plurality of second-axis heat sensitive blocks arranged in a staggered manner, the first-axis heat sensitive blocks disposed on a lower surface of the first substrate, the second-axis heat sensitive blocks disposed on a lower surface of the second substrate, the second substrate disposed between the first-axis heat sensitive blocks and the second-axis heat sensitive blocks; and
    conductive wires disposed on the substrate and electrically connected to the heat sensitive blocks.

15. The heat sensitive touch panel as claimed in claim 14, wherein the first-axis heat sensitive blocks are insulated from the second-axis heat sensitive blocks.

16. The heat sensitive touch panel as claimed in claim 14, wherein the substrate is a cover lens.

17. The heat sensitive touch panel as claimed in claim 14, wherein the conductive wires comprise input conductive wires and output conductive wires, and wherein each heat sensitive block is electrically connected with the corresponding input conductive wire and output conductive wire.

18. The heat sensitive touch panel as claimed in claim 14, further comprising a shielding layer disposed on the sensing layer to avoid generating a capacitance effect between a touch object and the sensing layer.

19. The heat sensitive touch panel as claimed in claim 14, wherein the heat sensitive blocks are thin sheets made of transparent or non-transparent materials.

20. The heat sensitive touch panel as claimed in claim 14, wherein the heat sensitive blocks are formed by doping a dopant into PEDOT:PSS.

21. The heat sensitive touch panel as claimed in claim 20, wherein the dopant includes one or more than two of sorbitol, ethylene glycol (EG), N-methyl pyrrolidone (NMP) and carbon nanotube (CNT).

* * * * *